Aug. 25, 1970  W. KLEIN  3,525,562
MICROSCOPE OBJECTIVE
Filed Aug. 16, 1967
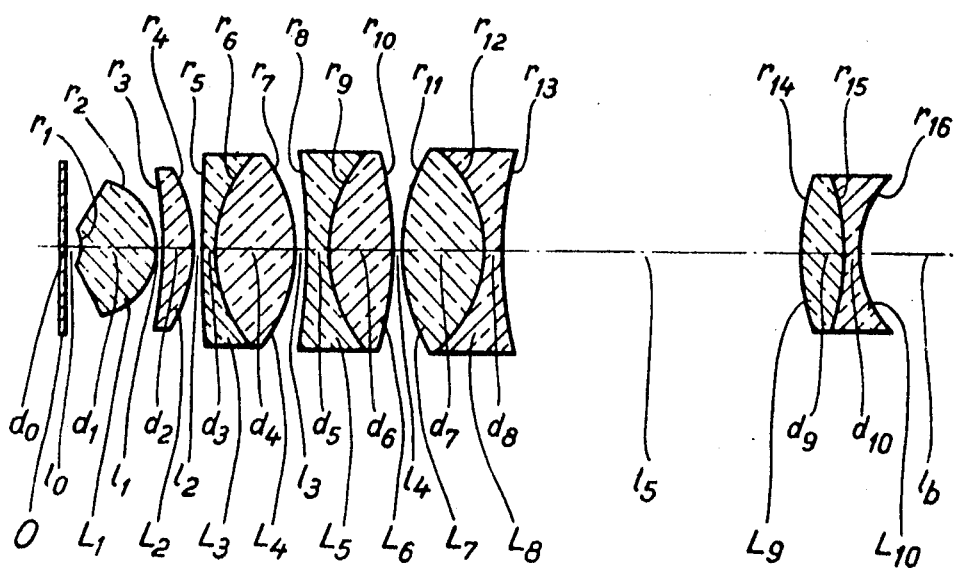
INVENTOR.
WALTER KLEIN
BY
Charles A. McClure
ATTORNEY.

United States Patent Office 3,525,562
Patented Aug. 25, 1970

3,525,562
MICROSCOPE OBJECTIVE
Walter Klein, Wissmar, Germany, assignor to Ernst Leitz G.m.b.H., Optische Werke, Wetzlar, Germany, a German company
Continuation-in-part of application Ser. No. 306,758, Sept. 5, 1963. This application Aug. 16, 1967, Ser. No. 661,055
Int. Cl. G02b *21/02, 11/32*
U.S. Cl. 350—215    2 Claims

ABSTRACT OF THE DISCLOSURE

A microscope objective of the dry type wherein the curvature of the field is corrected and the image field is flattened by a front lens consisting of a thick meniscus lens corrected of aberrations, particularly coma, curvature of the field and astigmatism, as well as extra-axial distortions, by providing two collecting cemented surfaces in the system of lenses of such an objective, each cemented surface having a concave side facing the object.

CROSS-REFERENCE TO RELATED APPLICATION

This is a continuation-in-part application of my copending application Ser. No. 306,758, filed Sept. 5, 1963, now abandoned.

BACKGROUND OF THE INVENTION

Field of the invention

The invention relates to microscope objectives, and more particularly the type of dry objective wherein the curvature of the field is corrected and the image field is flattened by a front lens consisting of a thick meniscus.

Description of the prior art

As is known over a century now, the various defects of an optical system in projecting can, at least partly, be overcome separately by different suitable means. One of such means is a rigidly symmetrical arrangement of all parts of the optical system, such as is the use of the so-called Gauss-type of photo objectives. Another possibility of separately correcting single picture defects was made known by Petzval about the mid-nineteenth century. Certain defects of this type are accumulated in one part of the lenses of the entire system and corrected in the other lenses. In the so-called Petzval objective which consists of two groups of lenses spaced widely apart from each other, the defect in the aperture and the asymmetrical defects of the entire system are corrected through the front lens member. Asymmetrical defects are those which enter the system just by being asymmetrically arranged. According to Petzval, the defects of the image field, e.g. preferably the astigmatism, are corrected through the rear lens. By skilled adaptation of the rear lens it is possible to transfer the diaphragm of the entire system to the front lens. The distance of the diaphragm is thereby reduced to zero for the front lens, so that the contribution of the front lens to the Seidel sum due to the shell defect is a constant which can be corrected by suitable adaptation of the rear lens.

Further details, for instance, can be gleaned from the monograph of Georg Franke, "Photographic Optic," published in the Akademischen Verlagsgesellschaft, Frankfurtam Main, 1963, appearing on page 138.

These general techniques as known for the correction of the photo-objective have now been improved and applied to micro-objectives in the present invention.

Microscope objectives of the general type of this invention are shown, for instance, in U.S. Pats. Nos. 2,644,-362 and 2,713,808, and in the German Pat. 970,606, and additional objective lenses are provided in these optical systems to correct aberrations the correction of which has been made more difficult by the addition of the thick meniscus front lens.

Also, Buzawa, U.S. Pat. 3,118,964 is of interest in showing use of a cemented lens in his objective lens group. However, the Table of Objectives as estimated by Buzawa is obviously incorrect.

SUMMARY OF THE INVENTION

In the present application, regarding the microscope objective, the entire optical system has been divided into two groups, one a first lens group (lenses 1 to 8 shown in the drawing with the radii $r_1$–$r_{13}$) at the object end of the system, and a second group (lenses 9 to 10 shown in the drawing with the radii $r_{14}$–$r_{16}$) at the image end of the system. All the above considerations apply to this division of the entire optical system. In addition, two cemented surfaces ($r_{12}$ and $r_{15}$ in the drawing) are especially advantageously used in a pair of cemented doublet lenses, preferably lenses 7 to 8 and 9 to 10, respectively, as shown in the drawing. Each of these surfaces has a concave side facing the object, which surface acts as a collecting cemented surface. The cemented surface $r_{12}$ is located in the first lens group at the next-to-last lens member thereof and serves to correct coma aberration within the zones of the lens. The cemented surface $r_{15}$ is located in the second group of lenses at the next to last member thereof and serves likewise to correct coma aberration, particularly at the edges of the coma of a bundle of rays from the large apertures of the system.

BRIEF DESCRIPTION OF THE DRAWING

In the drawing, lens 1 to 8 are a first group of lens positioned to the right of a glass stage at the object end of the system of lenses of the microscope objective lenses. In this group, $r_{12}$ is a cemented surface. Also, lenses 9 to 10 are a second group of lenses at the image end of the system. In this group $r_{15}$ is a cemented surface.

DESCRIPTION OF THE PREFERRED EMBODIMENTS

It is the primary object of this invention to provide a microscope objective of the dry type with excellent correction of all aberrations, particularly curvature of the field and astigmatism, as well as extra-axial distortions.

This object is accomplished according to the invention by providing two collecting cemented surfaces in the lenses of such objectives, each cemented surface having a concave side facing the object. Preferably, the cemented surfaces are provided in the lenses closer to the image end of the system and, in accordance with the preferred embodiments, the two objective lenses nearest the image consist of two components each, the two lens components being cemented together to define the two collecting cemented surfaces of the optical system.

Thus, the microscope objective according to the present invention comprises the following lens elements in the direction of the image: a first group of lenses comprising a front lens consisting of a thick meniscus lens of relatively large thickness, which is adjacent the object plane, at least three additional sets of lenses at least one of which is a cemented doublet defining airspaces therebetween, each air space having an axial length smaller than the axial thickness of the preceding lens, a second group of lenses consisting of a cemented doublet, one of which is a negative lens adjacent the image, the latter lenses defining an air space with the last preceding lens of the first group, and the two collecting cemented surfaces in said two cemented doublets of lenses serving to correct coma aberration, each cemented surface having a concave side facing the object. One of said cemented surfaces is effective to correct coma of the inner or near-axial rays and the other such surface is effective to correct the coma of the outer or off-axial rays received from the object by the objective.

The axial length of the air space between the last lens and its preceding lens is far in excess of the preceding air spaces $l_1-l_4$, that is, at least about 2 to 10 times as long as the focal length of the objective.

The single figure of the accompanying drawing shows a preferred embodiment of the microscope objective of this invention, the two collecting cemented surfaces being indicated at $r_{12}$ and $r_{15}$.

In the figure, the first group of lenses consists of the following lenses, viewed in order from a glass stage O having a thickness $d_0$:

(1) a single thick meniscus lens having a thickness $d_1$ and having a surface with a negative radius $r_1$ facing the object end of the objective and a surface with a negative radius $r_2$ facing the image end of the objective and possessing a positive refractive power;

(2) a single thin lens having a thickness $d_2$ and having a surface with a negative radius $r_3$ facing the object and a surface with a negative radius $r_4$ facing the image end;

(3 to 4) a first doublet of lenses of which lens 3 has a thickness $d_3$ and has a surface having a positive radius $r_5$ facing the object and an opposite, image side, surface having a positive radius $r_6$ and of which lens 4 has a thicknee $d_4$ and has a surface fitting against said image side of lens 3 and has an opposite surface having a negative radius $r_7$ facing the image end;

(5 to 6) a second doublet of lenses of which lens 5 has a thickness $d_5$ and has a surface having a negative radius $r_8$ facing the object and an opposite, image side, surface having a positive radius $r_9$ and of which lens 6 has thickness $d_4$ and has a surface fitting against said image side of lens 5 and has an opposite surface having a negative faces being cemented together; and (7 to 8) a first cemented doublet of lenses of which lens 7 has a thickness $d_7$ and has a surface having a positive radious $r_{11}$ facing the object end and an opposite, image side, surface having a negative radius $r_{12}$ and of which lens 8 has a thickness $d_8$ and has a surface fitting against said image side of lens 7 and has a surface having a positive radius $r_{13}$ facing the image end, the fitted surfaces being cemented together; and The second group of lenses consists of a second cemented doublet of lenses 9 to 10 of which lens 9 has a thickness $d_9$ and has a surface having a positive radius $r_{14}$ facing the object end and an opposite, image side, surface having a negative radius $r_{15}$ and of which lens 10 has a surface fitting against said image side of lens 9 and has a thickness $d_{10}$ and has a surface having a negative radius $r_{16}$ facing the image end, the fitted surfaces being cemented together, all said radii being radii of curvature.

Cementing is carried out by methods and means well known in the art. See, for example, Jacobs, "Fundamentals of Optics Engineering," McGraw-Hill Book Company, New York, 1943, p. 109.

Lens 1 is separated from the glass stage O by a distance $l_0$. Lens 1 and 2 are separated from each other by the distance $l_1$. Lens 2 and 3 are separated by a distance $l_2$. Lens 4 and 5 are separated by a distance $l_3$. Lens 6 and 7 are separated by a distance $l_4$. Lens 8 and 9 are separated by a distance $l_5$. Lens 10 is separated from the image by a distance $l_b$.

EXAMPLE

The following table gives the parameters of the preferred embodiment, wherein the letters $r$ designate the successive first and second radii, taken in the direction from the glass stage supporting the object to the image, of the lenses or their components, $d$ designate the successive axial thicknesses of the lenses or their components, $l$ designate the axial lengths of the air spaces between the lenses as well as between the object and the front lens, and the last lens and the image, respectively, $n_e$ is the refractive index of the lens or lens component glasses, taken on the $e$-line, $v_e$ is the Abbé number of these glasses, $f_e$ is the focal length of the entire optical system, A is the aperture and $B'_e$ is the magnification of the microscope:

TABLE $d$: Axial thickness of lenses   $l$: Axial length of air spaces

| Radii | | $n_e$ | $V_e$ | Lens |
|---|---|---|---|---|
| $r_1 = -2.392$ | $d_0 = 0.17$ $l_0 = 0.8807$ | 1.52491 | 58.3 | (1) |
| $r_2 = -3.96$ | $d_1 = 4.56$ | 1.78869 | 43.5 | 1 |
| $r_3 = -23.999$ | $l_1 = 0.25$ | | | |
| $r_4 = -7.98$ | $d_2 = 1.9$ | 1.48772 | 81.6 | 2 |
| $r_5 = +158.795$ | $l_2 = 0.33$ | | | |
| $r_6 = +7.877$ | $d_3 = 1.0$ | 1.55379 | 49.4 | 3 |
| $r_7 = -9.002$ | $d_4 = 4.9$ | 1.48772 | 81.6 | 4 |
| $r_8 = -40.845$ | $l_3 = 0.65$ | | | |
| $r_9 = +8.148$ | $d_5 = 1.0$ | 1.81272 | 40.6 | 5 |
| $r_{10} = -18.522$ | $d_6 = 4.0$ | 1.48772 | 81.6 | 6 |
| $r_{11} = +11.37$ | $l_4 = 0.3$ | | | |
| $r_{12} = -7.548$ | $d_7 = 5.0$ | 1.48772 | 81.6 | 7 |
| $r_{13} = +22.942$ | $d_8 = 1.0$ | 1.46011 | 67.3 | 8 |
| $r_{14} = +11.47$ | $l_5 = 17.65$ | | | |
| $r_{15} = -15.35$ | $d_9 = 2.5$ | 1.79192 | 25.5 | 9 |
| $r_{16} = +6.502$ | $d_{10} = 0.9$ | 1.70444 | 29.8 | 10 |
| | $l_b = 150.0$ | | | |
| $f_e = 4.0157$ | $\beta'_e = 40.007$ | A = 0.75 | | |

[1] Glass stage.

Computation and experiment have established that constructional data for the best forms of microscope objectives of the embodiment of the example and of the drawing preferably should lie within the ranges of values stated in the following statement of inequalities which relates (a) to all of the lens surfaces $r_1$ to $r_{16}$, naming said radii $r$ in order from the front or object side of the objective along the optical axis from the object plane, (b) the axial thicknesses $d$ of the lenses $d_1$ to $_{10}$, (c) refractive indexes $n_e$ of the glasses of lenses 1 to 10 and of the glass stage (based on the $e$ line) and (d) the Abbé number $v_e$ of the glasses of lenses 1 to 10 and of the glass stage:

(a) Ranges of radii $r$:

$0.4f < -r_1 < 0.9f$         $1.6f < r_9 < 2.6f$
$0.8f < -r_2 < 1.3f$         $3.5f < -r_{10} < 6.0f$
$4f < -r_3 < 10f$            $2.2f < r_{11} < 3.5f$
$1.6f < -r_4 < 2.6f$         $1.6f < -r_{12} < 2.4f$
$20f < r_5 < \infty$         $5f < r_{13} < 7f$
$1.6f < r_6 < 2.6f$          $2.5f < r_{14} < 3.5f$
$2.0f < -r_7 < 3.0f$         $3.5f < -r_{15} < 5.0f$
$7f < -r_8 < 15f$            $1.4f < r_{16} < 2.0f$ (b) Ranges of axial thicknesses $d$ of lenses and of glass stage:

Lens:

Glass stage $0.03f < d_0 < 0.06f$
    (1) $0.9f < d_1 < 1.4f$
    (2) $0.35f < d_2 < 0.7f$
    (3) $0.15f < d_3 < 0.5f$
    (4) $0.9f < d_4 < 1.7f$
    (5) $0.15f < d_5 < 0.5f$
    (6) $0.7f < d_6 < 1.5f$
    (7) $0.9f < d_7 < 1.7f$
    (8) $0.15f < d_8 < 0.5f$
    (9) $0.4f < d_9 < 1.0f$
    (10) $0.15f < d_{10} < 0.5f$ (c) Ranges of refractive indices $n_e$ of lenses and of glass stage:

Lens:

Glass stage $1.48 < n_e < 1.57$
(1) $1.70 < n_e < 1.85$
(2) $1.42 < n_e < 1.55$
(3) $1.48 < n_e < 1.63$
(4) $1.42 < n_e < 1.55$
(5) $1.70 < n_e < 1.90$
(6) $1.42 < n_e < 1.55$
(7) $1.42 < n_e < 1.55$
(8) $1.42 < n_e < 1.50$
(9) $1.70 < n_e < 1.90$
(10) $1.60 < n_e < 1.80$ (d) Abbe number $v_e$ of lenses and glass stage:

Lens:

Glass stage $50 < v_e < 70$
(1) $35 < v_e < 55$
(2) $70 < v_e < 95$
(3) $40 < v_e < 60$
(4) $70 < v_e < 95$
(5) $32 < v_e < 55$
(6) $70 < v_e < 95$
(7) $70 < v_e < 95$
(8) $55 < v_e < 75$
(9) $22 < v_e < 32$
(10) $< v_e < 35$ A thick meniscus lens is one having a dispersing surface which is more strongly curved than its converging surface and the axial thickness of the lens is greater than one half the radius of the dispersing surface. It has a relatively great negative or also positive focal length according to its thickness. Because of its great axial thickness such a meniscus possesses a positive refractive power provided that the axial thickness is at least half as large as the curved radius of the concave surface. As is shown in the example, the axial thickness is considerably greater than the curved radii $r_1$ and $r_2$ of both surfaces in contact with the meniscus and the refractive power accordingly is positive. This type of meniscus lens is also referred to in the art as a "thick negative meniscus," meaning that the curvature radius of the concave surface is smaller than the curvature radius of the convex side. Thus, in the table, it is shown that $r_1$ the concave side of lens 1 is smaller than $r_2$, the convex side of the lens.

The data in the embodiment of the example shows that the advantages provided by the invention as discussed above are satisfactorily obtained. The surface $r_{12}$ of the first cemented doublet lenses is effective to correct the coma of the inner or near-axial rays received from the object by the objective. The surface $r_{15}$ of the second cemented doublet lenses is effective to correct the coma of the outer or off-axial rays received from the object by the objective. The cemented doublet lenses are each composed of a biconvex element and a biconcave element having refractive indexes and curvatures thereof and of the cemented surfaces such that relatively great color correction and relatively little refraction takes place at the first cemented doublet, and such that relatively little color correction and relatively great refraction take place at the second cemented doublet.

I claim:

1. In a microscope objective with flattened image field for projecting an image of an object the objective consisting of a first and a second group of lenses, the first group being nearest the object plane and the second group nearest the image plane, the lenses being in air-spaced relationship and in optical alignment with each other, said first group of lenses consisting of, in the direction from the object to the image, a thick meniscus front lens of relatively large axial thickness having the radius of curvature of its concave surface smaller than the radius of curvature of its convex surface, a thin converging meniscus concave towards the object, a cemented doublet lens consisting of a concavo-convex lens element fitted on the concave side facing the image to a biconvex lens element, and a second cemented doublet lens consisting of a biconcave lens element fitted on the concave side facing the image to a biconvex lens element, each air space between the lenses of said first group having an axial length smaller than the axial thickness of the preceding one of said lenses, and said second group of the lenses nearest the image plane consisting of a pair of cemented doublet lenses separated by a large air space, each of said cemented doublet lenses of said second group consisting of a biconvex lens element cemented to a biconcave lens element so as to define a collecting cemented surface concave towards the object, the cemented surface of the doublet on the object side of the second group of lenses being effective to correct coma of the inner or near axial rays and the cemented surface of the doublet on the image side of the second group of lenses being effective to correct the coma of the outer or off-axial rays received from the object by the objective.

2. The microscope objective of claim 1 in which the axial length of the air space between the pair of cemented doublet lenses of said second group exceeds the focal length of the objective.

References Cited

UNITED STATES PATENTS

| 2,713,808 | 7/1965 | Klein | 350—177 |
| 3,118,964 | 1/1964 | Buzawa | 350—215 |
| 2,324,081 | 7/1943 | Herzberger | 350—216 |
| 3,132,200 | 5/1964 | Muller et al. | 350—216 |

FOREIGN PATENTS

| 889,687 | 2/1962 | Great Britain. |
| 755,955 | 8/1956 | Great Britain. |

DAVID SCHONBERG, Primary Examiner

R. J. STERN, Assistant Examiner

U.S. Cl. X.R.

350—176